US00RE41507E

(19) United States
(12) Reissued Patent
Meyers

(10) Patent Number: US RE41,507 E
(45) Date of Reissued Patent: Aug. 17, 2010

(54) AIR FILTER FOR A WELL

(75) Inventor: Kenneth A. Meyers, Lena, WI (US)

(73) Assignee: In-Well Technologies, Inc., Lena, WI (US)

(21) Appl. No.: 11/346,577

(22) Filed: Feb. 2, 2006

Related U.S. Patent Documents

Reissue of:
(64) Patent No.: 6,684,945
Issued: Feb. 3, 2004
Appl. No.: 10/079,285
Filed: Feb. 20, 2002

(51) Int. Cl.
*E21B 33/02* (2006.01)
*E21B 33/03* (2006.01)

(52) U.S. Cl. ..... 166/75.13; 55/505
(58) Field of Classification Search ..... 166/75.13, 166/97.1, 92.1, 93.1; 210/348, 445, 459; 55/505, 385.4
See application file for complete search history.

(56) References Cited

U.S. PATENT DOCUMENTS 2,273,505 A * 2/1942 Florian ..... 138/28
2,530,190 A * 11/1950 Carver ..... 138/26
2,695,753 A * 11/1954 Kirk, Jr. ..... 237/8 R
2,796,939 A * 6/1957 Woodruff ..... 166/228
2,806,537 A * 9/1957 Sparks, Sr. ..... 166/196
2,979,070 A * 4/1961 Payne ..... 137/192
3,038,396 A * 6/1962 Jameson, Jr. et al. ..... 94/33
3,076,479 A * 2/1963 Kai ..... 138/30
3,261,296 A * 7/1966 Weber ..... 103/87
3,273,577 A * 9/1966 Moore ..... 137/13
3,299,831 A * 1/1967 Watson et al. ..... 103/220
3,376,898 A * 4/1968 Hugley ..... 138/137
3,394,733 A * 7/1968 Jacuzzi ..... 137/568
3,442,292 A * 5/1969 Jacuzzi ..... 138/30
3,514,220 A * 5/1970 Hahn, Jr. ..... 417/151
3,536,102 A * 10/1970 Allweitz et al. ..... 138/30
3,543,854 A * 12/1970 Degen ..... 166/228
3,621,882 A * 11/1971 Kupiec ..... 138/30
3,708,965 A * 1/1973 Domnick ..... 55/488
3,814,543 A * 6/1974 Gritz ..... 417/26
4,036,616 A * 7/1977 Byrns ..... 55/498
4,094,789 A * 6/1978 Kemper ..... 210/188
4,322,230 A * 3/1982 Schoen et al. ..... 55/316
4,431,052 A * 2/1984 James ..... 166/112
4,583,594 A * 4/1986 Kojicic ..... 166/228
4,936,383 A * 6/1990 Towner et al. ..... 166/68

(Continued)

OTHER PUBLICATIONS

Water Well—Construction—Well Cap and Well Seal, Retrieved Apr. 30, 2001, http://abe.www.ecn.purdue.edu/~epados/farmstead/well/scr/construc4.htm.*

Monitor Division—Snorkel Well Cap Vent, Baker Mfg. Co., Evansville, WI, Retrieved Mar. 4, 2003, http://www.bakermfg.com/index.php3.*

Monitor Division—Premium Watertight Cap w/Screened Air Vent, Baker Mfg. Co., Evansville, WI, Retrieved Mar. 4, 2003. http://www.bakermfg.com/index.php3.*

*Primary Examiner*—Giovanna C Wright
(74) *Attorney, Agent, or Firm*—Alan Kamrath; Kamrath & Associates PA

(57) ABSTRACT

An air filter for a well is installed within a well casing of the well. The air filter forming an airtight seal around the well casing of the well, such that all the air that enters and exits the well must pass through the air filter. The air filter preferably includes a filter housing, at least one removable gasket and a removable filter cartridge installed within an opening extending through the filter housing. The air filter prevents dirt, dust, bacteria, gaseous chemicals, volatile organic compounds, (VOCs), insects and other [air born] *airborne* contaminants from entering and possibly contaminating the well. An air filter may also be installed within a vent pipe extending through a well seal attached to the top of a well casing of a well.

31 Claims, 7 Drawing Sheets

U.S. PATENT DOCUMENTS 5,190,108 A * 3/1993 Mansuy ..... 166/371
5,262,065 A * 11/1993 Hansen ..... 210/747
5,281,101 A * 1/1994 Bevington ..... 417/38
5,353,949 A * 10/1994 Seibert et al. ..... 220/371
5,411,084 A * 5/1995 Padden ..... 166/230
5,782,299 A * 7/1998 Simone et al. ..... 166/230
5,803,174 A * 9/1998 Gilmore et al. ..... 166/292
5,820,762 A * 10/1998 Bamer et al. ..... 210/661
5,899,271 A * 5/1999 Simone et al. ..... 166/230
5,937,944 A * 8/1999 Simone et al. ..... 166/230
5,988,984 A * 11/1999 Austin ..... 417/44.2
6,109,349 A * 8/2000 Simone et al. ..... 166/230
6,202,750 B1 * 3/2001 Ohanesian ..... 166/236
6,217,639 B1 * 4/2001 Jackson ..... 96/134
6,328,071 B1 * 12/2001 Austin ..... 138/30
6,349,765 B1 * 2/2002 Meyers et al. ..... 166/85.2
6,418,969 B1 * 7/2002 Bertagna ..... 138/30
6,422,822 B1 * 7/2002 Holmes ..... 417/9
6,595,277 B2 * 7/2003 Rasmussen et al. ..... 166/75.13
6,684,945 B1 * 2/2004 Meyers ..... 166/76.13
6,910,532 B2 * 6/2005 Meyers et al. ..... 166/85.2
7,013,924 B1 * 3/2006 Meyers et al.
2005/0226751 A1 * 10/2005 Meyers et al. ..... 417/543

* cited by examiner

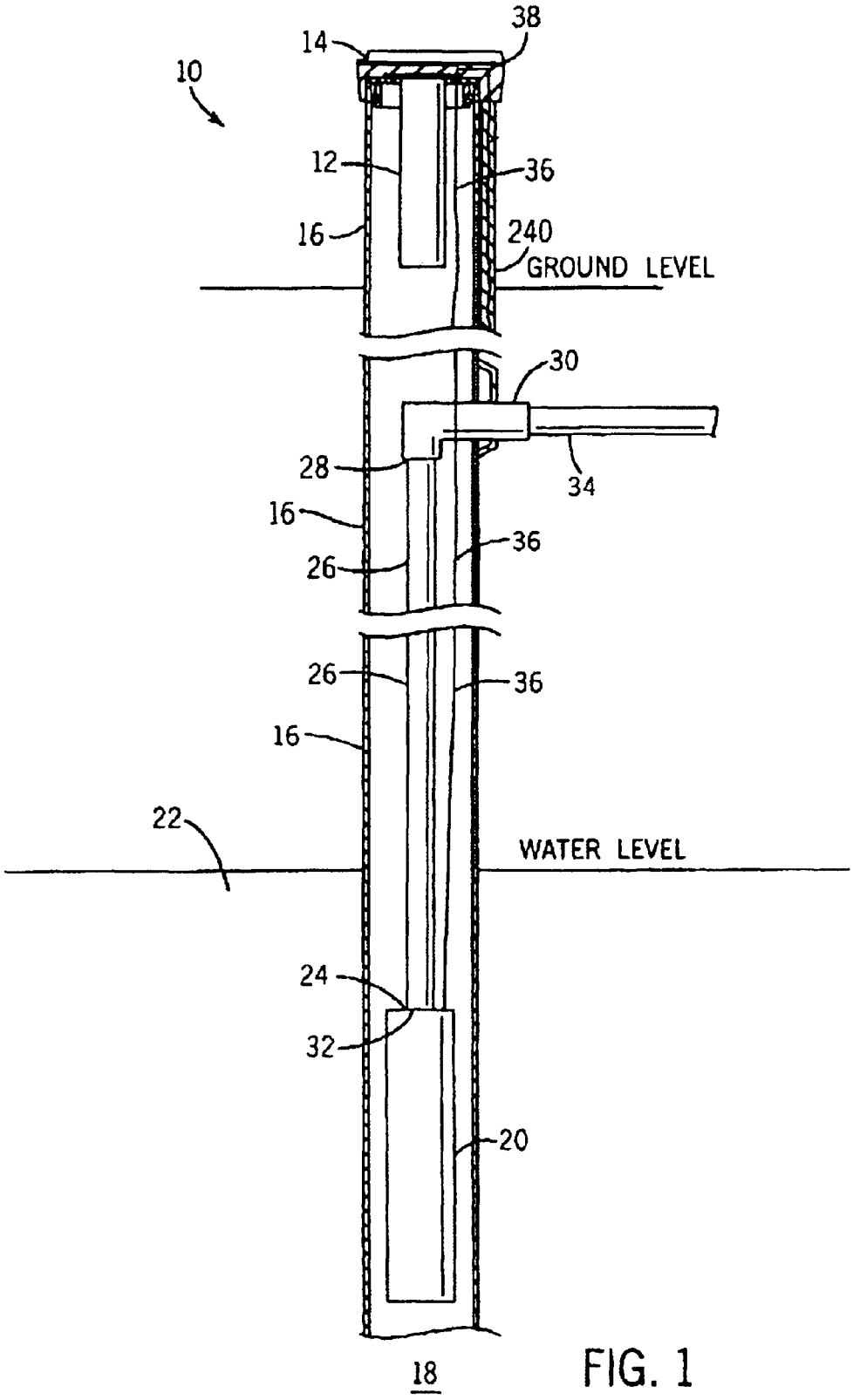
FIG. 1
Amended

FIG. 2
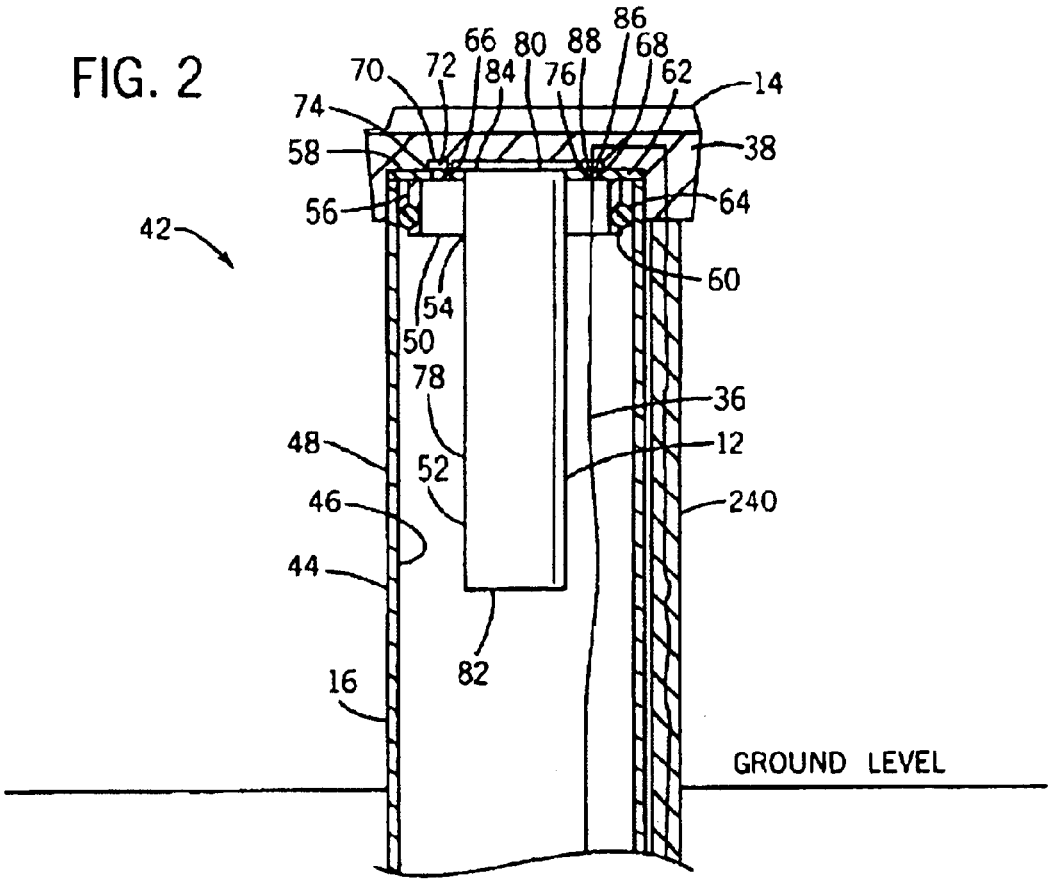
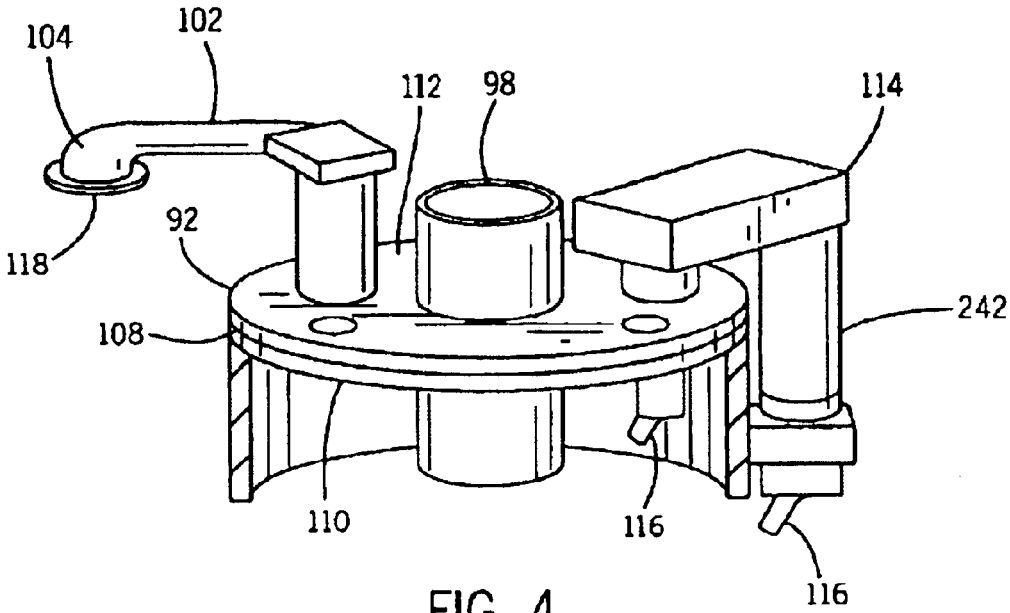
FIG. 4

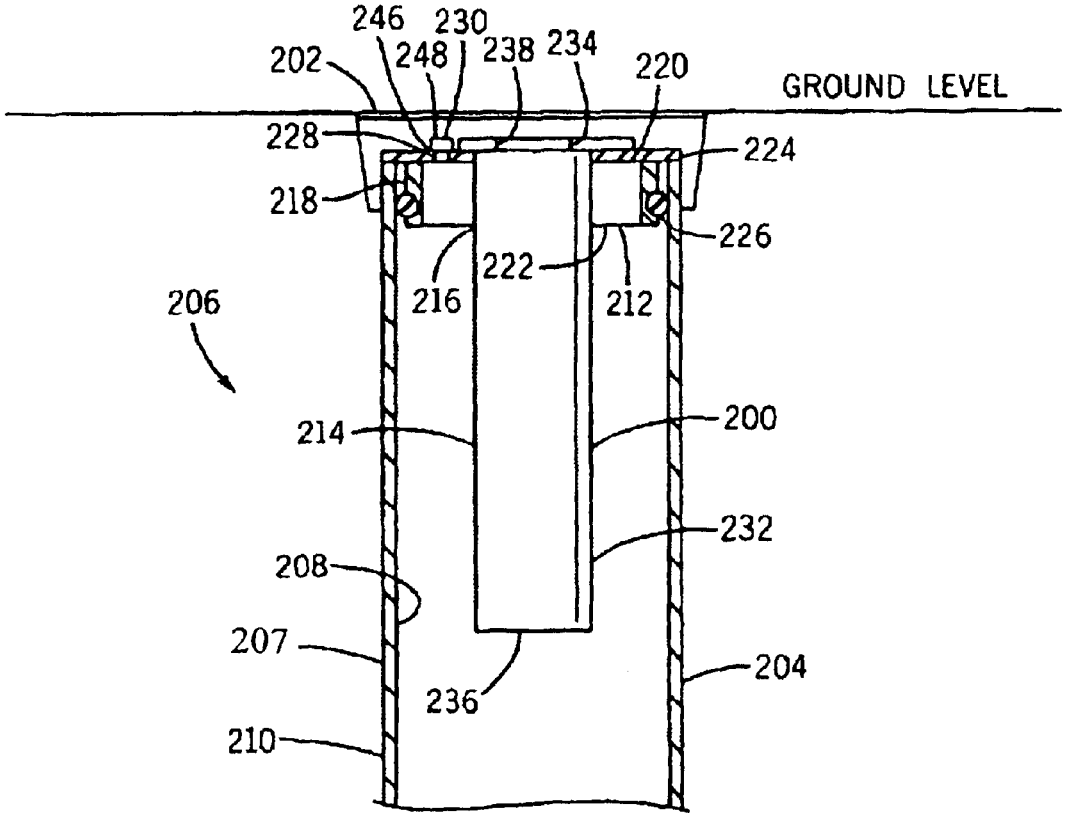
FIG. 8
Amended

AIR FILTER FOR A WELL

Matter enclosed in heavy brackets [ ] appears in the original patent but forms no part of this reissue specification; matter printed in italics indicates the additions made by reissue.

BACKGROUND OF THE INVENTION

The present invention relates to an air filter for a well[,] and, more particularly, to an air filter assembly installed within the well casing of a well to prevent [air borne] *airborne* contaminants from entering the well. The air filter assembly of the present invention is preferably designed for application in water wells, but may be applied to other systems such as oil wells, natural gas wells, gasoline fuel dispensing systems and monitoring wells. The air filter assembly of the present invention is designed to prevent pollutants from contaminating a well.

A typical water well is established by first drilling a hole in the ground in search of water from a water bearing aquifer. Once water is reached by the drill, a well casing is inserted into the bore hole to preserve the sides of the well. The well casing is typically a steel or plastic pipe installed while drilling a well, to prevent collapse of the well bore hole and to allow placement of a submersible pump and other equipment. The well casing typically extends several inches above the ground. A submersible pump is inserted into the well below the water level to pump water from the aquifer. One end of a drop pipe is attached to the submersible pump to draw water out of the well. The other end of the drop pipe is attached to a discharge pipe for carrying water to a pressure tank for distribution and use.

To prevent contaminants from entering the well and to protect the inside of the casing and the well, a well cap may be installed on top of the well casing extending above the ground. The well cap is used to cover the top of the well casing pipe and thereby seal the top of the well casing to prevent the entry of contaminants in the well. The well cap is generally used in systems where the discharge pipe for distributing and supplying water is underground. The well cap also typically includes a conduit box for routing electrical wires from the submersible pump to an electrical power source. The well cap is typically not airtight, and therefore allows air to enter the well around openings between the well cap and the top of the well casing. This opening allows air to flow in and out of the well during pressure changes. In addition to the well cap, a wire screen may be attached to the top of the well casing to prevent large objects from contaminating the well.

As an alternative to the well cap, a well seal may also be used to cover the top of the well casing. The well seal includes a gasket that seals the top of the well casing to prevent entry of contaminants in the well. The well seal is generally used in systems where the discharge pipe for distributing and supplying water comes up through the top of the well casing. The well seal also typically includes openings for a screened vent pipe and a conduit box to pass through the gasket. The screened vent pipe allows air to enter and exit the well during pressure changes. The conduit box is used for routing electrical wires from the submersible pump to an electrical power source. The well seal provides a seal around the discharge pipe, vent pipe and conduit box. However, air enters the well through the vent pipe. The vent pipe screen functions to reduce contaminant entry into the well by preventing large objects from entering the well.

During use, the submersible pump pulls air into the well. The air may include dirt, dust, bacteria, gaseous chemicals, volatile organic compounds (VOCs), insects and other [air born] *airborne* contaminants that may contaminate the well and should be removed. When the pump stops, a change in pressure forces air out of the well. In addition, the normal changes in atmospheric pressure cause air to flow in and out of the well. There is nothing in the prior art to remove [air born] *airborne* contaminants from entering a well and possibly contaminating the water in the well. The well cap and well seal do not prevent dirt, dust, bacteria, gaseous chemicals, VOCs and other [air born] *airborne* contaminants from entering the well and possibly contaminating the water.

Accordingly, there is a need for an air filter for a well. The air filter [being] *is* installed within the well casing of the well or attached to the side of the well casing for preventing air borne contaminants from entering the well. The air filter of the present invention removes dirt, dust, bacteria, gaseous chemicals and VOCs from the air, and stops insects from entering the well.

SUMMARY OF THE INVENTION

The present invention provides an air filter for a well. The well of the present invention preferably includes a submersible pump inserted within a well casing of a well below the water level to pump water from a water bearing aquifer. A drop pipe is connected between the submersible pump and a discharge pipe for distribution of the water from the well. The well of the present invention may also be a monitoring well that typically does not include the submersible pump, drop pipe or discharge pipe, but simply includes a well casing.

An air filter assembly is preferably installed within the well casing of a well forming an airtight seal between the casing and the filter assembly, so that all the air that enters and exits the well must pass through the filter. The filter assembly preferably includes a housing, at least one gasket and a removable filter cartridge. The air filter assembly of the present invention is designed for use on well casings of various diameters. Therefore various diameter housings, gaskets, and cartridges may be used to fit the various diameter well casings. As mentioned above, different diameter gaskets may be used to fit the different diameter well casings. The gaskets preferably forming an airtight seal [and having] *has* at least one opening extending therethrough for receiving a relief valve and submersible pump wires. The airtight seal is maintained around the relief valve and pump wires. Grommets may also be used to perfect the seal around the relief valve and pump wires. Alternatively, an adjustable gasket may be used to fit the different diameter well casings. For example, the adjustable gasket could have a plurality of layers, like a roll of tape, that may be removed from the gasket or re-applied to the gasket to vary the diameter of the gasket. The relief valve and pump wires that extend through the gasket are preferably sealed between layers of the adjustable gasket or sealed by at least one grommet.

The present invention includes several different embodiments. In a first embodiment, an air filter assembly is installed within a top portion of a well casing having a well cap attached to the top of the well casing. In a second embodiment, an air filter is installed within a vent pipe extending through a well seal attached to the top of a well casing. In a third embodiment, an air filter assembly is installed within a branch pipe extending from an opening in one side of a well casing. In a fourth embodiment, an air filter assembly is installed within a top portion of a well casing of a monitoring well.

Various other features, objects, and advantages of the invention will be made apparent to those skilled in the art from the following drawings and detailed description of the invention.

BRIEF DESCRIPTION OF THE DRAWINGS

FIG. 1 is a partial cross-sectional exploded schematic representation of a well system according to a first embodiment of the present invention, showing an air filter assembly installed under a well cap of a well casing of a well;

FIG. 2 is an enlarged partial cross-sectional view of the air filter assembly installed under the well cap of the well casing of the well of FIG. 1;

FIG. 4 is an enlarged partial cross-sectional view of the air filter installed within the well seal attached to the top of the well casing of the well of FIG. 3;

FIG. 8 is an enlarged partial cross-sectional view of the air filter assembly installed in the well casing of the monitoring well of FIG. 7.

DETAILED DESCRIPTION OF THE INVENTION

Figure 3:
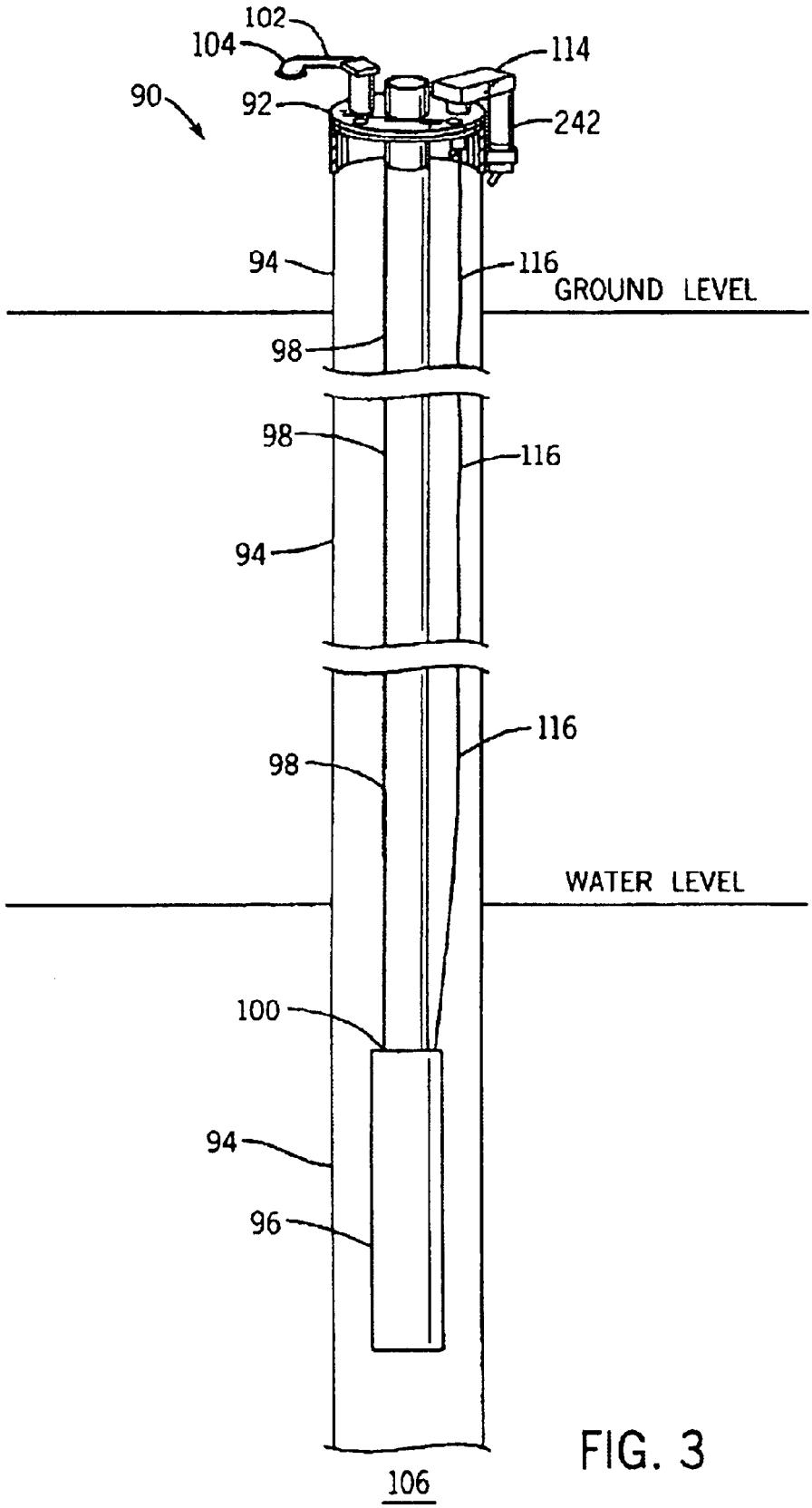
FIG. 3 is a partial cross-sectional exploded schematic representation of a well system according to a second embodiment of the present invention, showing an air filter installed within a well seal attached to the top of a well casing of a well.

FIG. 1 illustrates a schematic representation of one embodiment of a well system 10 comprising an air filter assembly 12 installed under a well cap 14 on top of a well casing 16 of a well 18. A submersible pump 20 is installed in the well 18 below the water level to pump water from a water bearing aquifer 22. A first end 24 of a drop pipe 26 is connected to the output 32 of the submersible pump 20. A second end 28 of the drop pipe 26, opposite the first end 24, is connected to a pitless adapter 30, which is connected to a discharge pipe 34 for distribution of water from the well. Water flows from the submersible pump 20 through the drop pipe 26 and pitless adapter 30 into the discharge pipe 34. The submersible pump 20 is preferably electrically powered and thus, includes a plurality of electrical wires 36 connected to the pump 20 that extend up through the well casing 16 and out through the well cap 14 for connection to an external electrical power source (not shown). In the well cap 14, the wires 36 travel through a conduit box 38 into a conduit [40] *240* which leads the wires underground for connection to the power source.

FIG. 2 shows an enlarged partial cross-sectional view of a top portion 42 of the well casing 16 that extends above the ground. The well casing 16 preferably having a circular *cross section* sidewall 44 with an inner surface 46 and an outer surface 48. The air filter assembly 12 is preferably installed under the well cap 14 within the top portion 42 of the well casing 16. The air filter assembly 12 preferably includes a cylindrically shaped filter housing 50 with a filter cartridge 52 removably inserted within an opening 54 extending through the center of the filter housing 50. The cylindrically shaped filter housing 50 comprises an outer sidewall 56, a top surface 58, a bottom surface 60, and a doughnut shaped gasket 62 removably attached to the top surface 58 of the housing. The housing gasket 62 extends outwardly from the circular opening 54 past the outer sidewall 56 for sealing the housing 50 to the top of the well casing 16. In addition, an o-ring seal 64 is formed around the outer sidewall 56 of the housing 50 for sealing the outer sidewall 56 *of the* housing against the inner surface 46 of the sidewall 44 of the well casing 16.

The housing gasket 62 attached to the top of the housing 50 preferably includes at least two relatively small openings 66, 68 extending therethrough for receiving a relief valve 70 and the plurality of pump wires 36. The relief valve 70 is sealed in the first opening 66 and functions by allowing airflow through the valve 70 once the filter cartridge 52 becomes clogged. As air flows through the relief valve 70, an alarm 72 incorporated into the relief valve 70 emits an audio signal signifying that the filter cartridge 52 is clogged and should be [to] replaced. The second opening 68 allows the plurality of pump wires 36 to pass through the filter housing 50 and on to the conduit box 38 and conduit 240 for connection to the power source. Both the first and second openings 66, 68 may include grommets 74, 76 to assure an airtight seal around the relief valve 70 and plurality of pump wires 36 that extend through the openings 66, 68 in the housing gasket 62.

The filter cartridge 52 removably inserted within the opening 54 of the filter housing 50 is also preferably cylindrically shaped with an outer sidewall 78, a top surface 80, and a bottom surface 82. A doughnut shaped gasket 84 is preferably removably attached to the top surface 80 of the cartridge 52 for sealing around the opening 54 extending through the housing 50 and allowing air to flow through the cartridge 52. The cartridge gasket 84 preferably extends outwardly past the outer sidewall 78 for sealing against the housing gasket 62. Once the filter cartridge 52 is installed in the filter housing 50, an airtight seal is formed between the cartridge gasket 84 and the housing gasket 62. Therefore, all air flowing into and out of the well must flow through the filter cartridge 52. The cartridge gasket 84 may preferably include a relatively small opening 86 extending therethrough for receiving the plurality of pump wires 36 to pass through. The opening 86 may include a grommet 88 to assure an airtight seal around the plurality of pump wires 36 as they pass through the cartridge gasket 84.

The filter cartridge of the present invention is preferably a canister type filter element that is easily removable from the filter housing for replacement purposes. The filter cartridge is preferably made of special reinforced paper that won't tear apart and won't deteriorate and fall into the well. An example filter cartridge that may be used in the present invention is a PharmaGard™ V-II Series Filter Cartridge manufactured by Seitz Division of U.S. Filter Company, or equivalent. The gaskets are also preferably removable from the housing and cartridge, so that they don't need to be replaced when the cartridge is replaced. The gaskets are preferably made of a neoprene rubber material that won't deteriorate over time.

The air filter assembly of the present invention is designed for use on well casings of various diameters. The type of gaskets used in the present invention may be of several different embodiments. In a first embodiment, gaskets of different diameters are used to fit different diameter well casings. In an alternate embodiment, an adjustable gasket may be used to fit on different diameter well casings. For example, the adjustable gasket could have a plurality of layers, like a roll of tape, that may be removed from the gasket or re-applied to the gasket to vary the diameter of the gasket. In this embodiment, the relief valve and pump wires are sealed between layers of the adjustable gasket.

FIGS. 3 and 4 illustrate another embodiment of the present invention. FIG. 3 is similar to FIG. 1 except that the well system 90 includes a well seal 92 attached to the top of a well casing 94 instead of a well cap. The well system 90 comprises a submersible pump 96 and a drop pipe 98 connected to the output 100 of the pump 96 that extends up through the top of the well seal 92 to a discharge pipe (not shown).

A well seal is typically used to cover the top of a well casing to prevent the entry of surface runoff into the well during flooding. A well seal differs from a well cap in that the well seal has a gasket to seal the top of the well casing, whereas a well cap does not include a gasket to seal the top of the well casing. A well seal typically includes a screened vent pipe that extends through the gasket to allow air to flow into and out of the well during changes in pressure. The screen is necessary to reduce contaminant entry into the well. A well seal also typically includes a conduit box and conduit that extend[s] through the gasket to allow a plurality of electrical wires from the submersible pump to pass through for connection to an external power source.

Referring again to FIGS. 3 and 4, an air filter 102 is preferably installed within a vent pipe 104 extending through the well seal 92 attached to the top of the well casing 94. The vent pipe 104 allows air to flow into and out of the well 106. FIG. 4 shows an enlarged partial cross-sectional view of the top of the well casing 94. The well seal 92 preferably includes a gasket 108 sandwiched between a bottom plate 110 and a top plate 112. The well seal 92 further includes a conduit box 114 and a conduit 242 that allow a plurality of electrical wiring 116 from the submersible pump 96 to be connected to an external power source (not shown). The vent pipe 104 includes a screen 118 and the air filter 102 to remove dirt, dust, bacteria, gaseous chemicals, VOCs, insects and other contaminants from entering the well.

Figure 5:
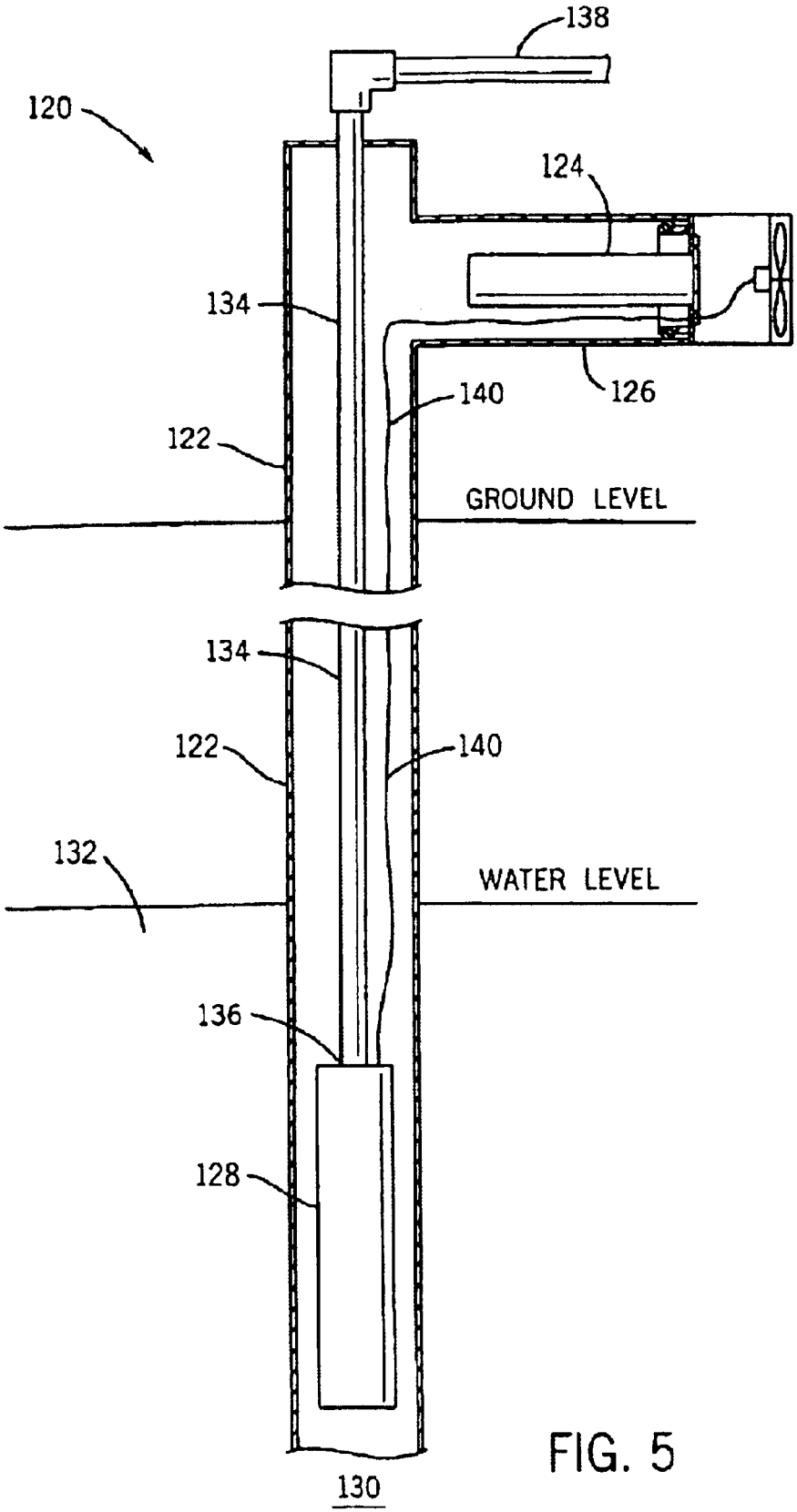
FIG. 5 is a partial cross-sectional exploded schematic representation of a well system according to a third embodiment of the present invention, showing an air filter assembly installed on the side of a well casing of a well.
Figure 6:
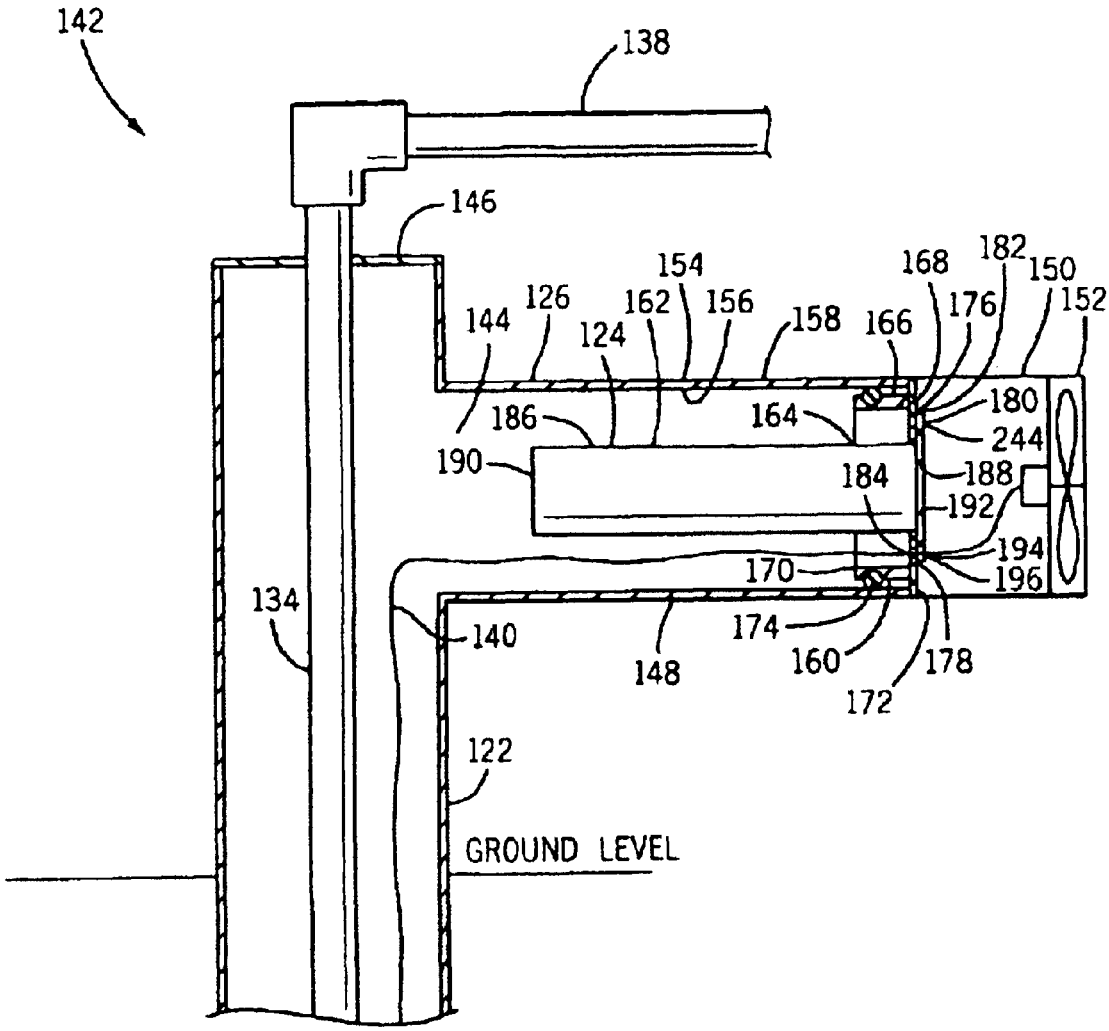
FIG. 6 is an enlarged partial cross-sectional view of the air filter assembly installed on the side of the well casing of the well of FIG. 5.

FIGS. 5 and 6 illustrate yet another embodiment of the present invention. FIG. 5 illustrates a schematic representation of a commercial or municipal well system 120 that typically has a larger diameter well casing 122 than residential water wells. The well system 120 comprises an air filter assembly 124 installed within a branch pipe 126 extending from one side of the well casing 122.

Similar to FIGS. 1 and 3, a submersible pump 128 is installed in a well 130 below the water level to pump water from a water bearing aquifer 132. A drop pipe 134 is connected to the output 136 of the submersible pump 128 and extends up through the well casing 122 to a discharge pipe 138 for distribution and use. The top of the well casing 122 is sealed around the drop pipe 134. A plurality of electrical wires 140 connected to the pump 128 extend up through the well casing 122 for connection to an external electrical power source (not shown).

FIG. 6 shows an enlarged partial cross-sectional view of a top portion 142 of the well casing 122 that extends above ground level and includes a branch pipe 126 extending from an opening 144 on one side of the well casing 122 for allowing air to flow through the well. The air filter assembly 124 is installed within the branch pipe 126. The drop pipe 134 extends through the top of the well casing 122 and is connected to the discharge pipe 138. A well seal 146 seals the top of the well casing 122 around the drop pipe 134. The branch pipe 126 includes a first section 148 with the air filter assembly 124 installed therein and a second section 150 with a fan assembly 152 installed therein for moving air through the well.

The branch pipe 126 preferably includes a circular *cross section* sidewall 154 with an inner surface 156 and an outer surface 158. The air filter assembly 124 preferably includes a filter housing 160 with a filter cartridge 162 removably inserted within an opening 164 extending through the center of the filter housing 160. The cylindrically shaped filter housing 160 preferably comprises an outer sidewall 166, a top surface 168, a bottom surface 170, and a doughnut shaped gasket 172 removably attached to the top surface 168 of the housing 160. The housing gasket 172 extends outwardly from the circular opening 164 past the outer sidewall 166 for sealing the housing 160 to the first section 148 of the branch pipe 126. In addition, an o-ring seal 174 is formed around the outer sidewall 166 of the housing 160 for sealing against the inner surface 156 of the sidewall 154 of the branch pipe 126.

The housing gasket 172 preferably includes at least two relatively small openings 176, 178 extending therethrough for receiving a relief valve 180 and the plurality of pump wires 140. The relief valve 180 is sealed in the first opening 176 and functions by allowing airflow through the valve 180 once the filter cartridge 162 becomes clogged. As air flows through the relief valve 180, an alarm 244 incorporated into the relief valve 180 emits an audio signal signifying that the filter cartridge 162 is clogged and should be [to] replaced. The second opening 178 allows the plurality of pump wires 140 to pass through the filter housing 160 for connection to the fan assembly 152 and a power source (not shown). Both the first and second openings 176, 178 may include grommets 182, 184 to assure an airtight seal around the relief valve 180 and plurality of pump wires 140.

The filter cartridge 162 removably inserted within the opening 164 of the filter housing 160 is also preferably cylindrically shaped with an outer sidewall 186, a top surface 188, and a bottom surface 190. A doughnut shaped gasket 192 is preferably removably attached to the top surface 188 of the cartridge 162 for sealing around the opening 164 extending through the housing 160 and allowing air to flow through the cartridge 162. The cartridge gasket 192 extends outwardly past the outer sidewall 186 for sealing against the housing gasket 172. Once the filter cartridge 162 is installed in the filter housing 160, an airtight seal is formed between the cartridge gasket 192 and the housing gasket 172. Therefore, all air flowing into and out of the well [106] *130* must flow through the filter cartridge 162. The cartridge gasket 192 may preferably include a relatively small opening 194 extending therethrough for allowing the plurality of pump wires 140 to pass through. The opening 194 may include a grommet 196 to assure an airtight seal around the plurality of pump wires 140.

Figure 7:
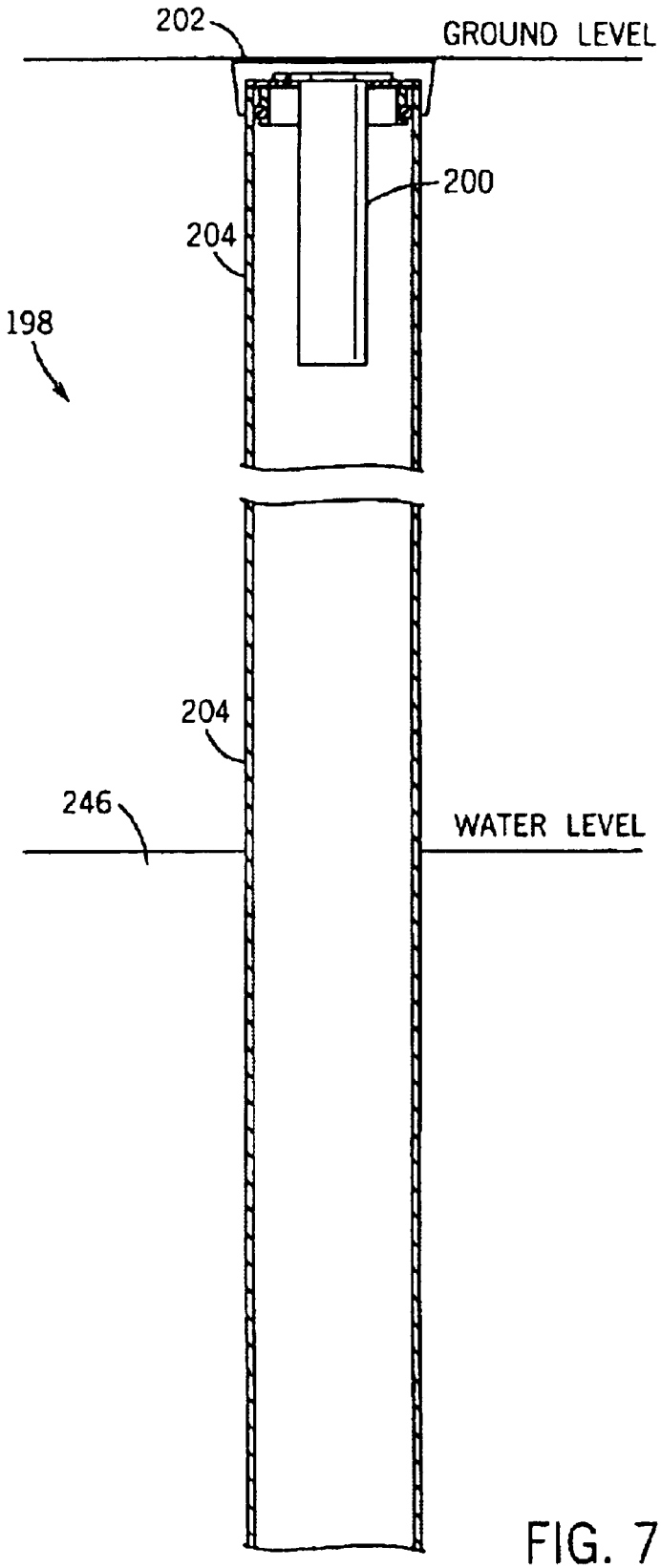
FIG. 7 is a partial cross-sectional exploded schematic representation of a monitoring well according to the present invention, showing an air filter assembly installed in a well casing of the monitoring well.

FIGS. 7 and 8 illustrate still yet another embodiment of the present invention. FIG. 7 illustrates a schematic representation of a monitoring well 198 that is typically drilled near underground storage tanks for monitoring ground water 246 for possible contaminants leaking from the underground storage tanks. The monitoring well 198 comprises an air filter assembly 200 installed under a well cap 202 on top of a well casing 204.

FIG. 8 shows an enlarged partial cross-sectional view of a top portion 206 of the well casing 204. The well casing 204 preferably includes a circular *cross section* sidewall [206] *207* with an inner surface 208 and an outer surface 210. The air filter assembly 200 is preferably installed under the well cap 202 within the top portion 206 of the well casing 204. The air filter assembly 200 preferably includes a filter housing 212 with a filter cartridge 214 removably inserted within an opening 216 extending through the center of the filter housing 212. The filter housing 212 is preferably cylindrically shaped with an outer sidewall 218, a top surface 220, a bottom surface 222, and a doughnut shaped gasket 224 removably attached to the top surface 220 of the housing 212. The housing gasket 224 extends outwardly from the circular opening 216 past the outer sidewall 218 for sealing the housing 212 to the top of the well casing 204. In addition, an o-ring seal 226 is formed around the outer sidewall 218 of the housing 212 for sealing the outer sidewall 218 against the inner surface 208 of the sidewall [206] *207* of the well casing 204.

The housing gasket 224 attached to the top of the filter housing 212 preferably includes at least one relatively small opening 228 extending therethrough for receiving a relief valve 230 therein. The opening 228 may include a grommet 246 to assure an airtight seal around the relief valve 230. The relief valve 230 allows airflow through the *relief* valve once the filter cartridge 214 becomes clogged. As air flows through the relief valve 230, an alarm [244] *248* incorporated within the relief valve 230 emits an audio signal signifying that the filter cartridge 214 is clogged and should be to replaced.

The filter cartridge 214 removably inserted within the opening 216 of the filter housing 212 is also preferably cylindrically shaped with an outer sidewall 232, a top surface 234, and a bottom surface 236. A doughnut shaped gasket 238 is preferably removably attached to the top surface 234 of the cartridge 214 for sealing around the opening 216 and allowing air to flow through the cartridge 214. The cartridge gasket 238 extends outwardly past the outer sidewall 232 for sealing against the housing gasket 224. Once the filter cartridge 214 is installed in the filter housing 212, an airtight seal is formed between the cartridge gasket 238 and the housing gasket 224. The well cap 202 is positioned on top of the well casing 204 above the air filter assembly 200. All air flowing into and out of the well must flow through the filter cartridge 214.

While the invention has been described with reference to preferred embodiments, those skilled in the art will appreciate that certain substitutions, alterations and omissions may be made without departing from the spirit of the invention. Accordingly, the foregoing description is meant to be exemplary only, and should not limit the scope of the invention set forth in the following claims.

I claim:

1. An air filter for a well comprising:

a filter housing mounted to a well casing;

a filter cartridge removably mounted within an opening extending through the filter housing;

a first sealing means for sealing the filter housing to the well casing; and a second sealing means for sealing the filter cartridge to the filter housing.

2. The air filter of claim 1, wherein the first sealing means is a gasket removably mounted to the top of the filter housing.

3. The air filter of claim 2, wherein the gasket is an adjustable gasket that will fit on well casings having different diameters.

4. The air filter of claim 1, wherein the second sealing means is a gasket removably mounted to the top of the filter cartridge.

5. The air filter of claim 4, wherein the gasket is an adjustable gasket that will fit on well casings having different diameters.

6. The air filter of claim 1, further comprising an o-ring seal mounted around the filter housing for sealing the filter housing against the inner wall of the well casing.

7. The air filter of claim 1, further comprising an air valve mounted within the first sealing means.

8. The air filter of claim 7, wherein the air valve includes an alarm that provides an audio signal when the filter cartridge becomes clogged.

9. The air filter of claim 1, wherein the first and second sealing means includes an opening extending therethrough for allowing wires from a submersible pump to pass through the air filter for connection to a power source.

10. The air filter of claim 1, wherein the filter housing is installed within a vent pipe extending from the well casing.

11. The air filter of claim 1, wherein the filter housing is installed within a pipe extending from an opening in the well casing.

12. An air filter assembly installed in a well comprising:

a filter housing mounted in the well;

a filter cartridge removably mounted within an opening extending through the filter housing; and sealing means for sealing the filter housing and filter cartridge within the well.

13. The air filter assembly of claim 12, wherein the sealing means is at least one gasket removably mounted to the filter housing and filter cartridge.

14. The air filter assembly of claim 12, wherein the filter housing is in the shape of a hollow cylinder with an o-ring seal around its outer sidewall.

15. The air filter assembly of claim 12, further comprising at least two openings extending through the sealing means for mounting a relief valve and allowing a plurality of pump wires to pass through.

16. The air filter assembly of claim 15, wherein the openings include grommets to seal around the relief valve and wires.

17. The air filter assembly of claim 12, wherein the filter cartridge is a canister type filter element.

18. The air filter assembly of claim 12, wherein the sealing means are at least two adjustable gaskets having varying diameters.

19. An air filter assembly installed within a well system, the air filter assembly comprising:

a filter housing mounted within the well system;

a filter cartridge removably mounted within the filter housing; and sealing means for sealing the filter housing and filter cartridge within the well system.

20. The air filter assembly of claim 19, wherein the air filter assembly is installed within a pipe of the well system.

21. The air filter assembly of claim 19, wherein the air filter assembly is installed within an air entrance of the well system.

22. An air filter for a well comprising:

a filter for filtering air entering the well; and sealing means for sealing the filter to an air entrance of the well to ensure that all air entering the well flows through the filter.

*23. An air filter assembly for a well system including an air entrance having a cylindrical sidewall, with the air filter assembly comprising, in combination: a filter housing for removable mounting to the cylindrical sidewall of the well system, with the filter housing including a filter cartridge, with the filter housing and the filter cartridge being sealed with the cylindrical sidewall to ensure that all air flowing through the air entrance flows through the air filter cartridge.*

*24. The air filter assembly of claim 23, further comprising, in combination: a first opening formed in the*

*filter housing spaced from the filter cartridge; and a relief valve sealed in the first opening, with air being allowed to flow past the filter housing when the filter cartridge is clogged.*

*25. The air filter assembly of claim 24, further comprising, in combination: a second opening formed in the filter housing spaced from the filter cartridge allowing pump wires to pass through the filter housing; and grommets in the first and second openings for assuring an airtight seal.*

*26. The air filter assembly of claim 25, wherein the filter housing is installed in the cylindrical sidewall in a form of a well casing of a well system.*

*27. The air filter assembly of claim 26, further comprising, in combination: a well cap, with the filter housing installed under the well cap and intermediate the well cap and the air entrance.*

*28. The air filter assembly of claim 25, wherein the filter housing is installed in the cylindrical sidewall in a form of a branch pipe extending from a side of a well casing of the well system.*

*29. The air filter assembly of claim 28, further comprising, in combination: a donut-shaped gasket removably attached to the filter housing, with the donut-shaped gasket sealing the filter housing with the cylindrical sidewall, with the first and second openings formed in the gasket.*

*30. The air filter assembly of claim 29, wherein the gasket is an adjustable gasket that will fit with the cylindrical sidewall of different diameters.*

*31. The air filter assembly of claim 23, wherein the filter cartridge is removably mounted within the filter housing, with an airtight seal being fixed between the filter cartridge and the filter housing.*

* * * * *

UNITED STATES PATENT AND TRADEMARK OFFICE

CERTIFICATE OF CORRECTION

PATENT NO. : RE 41,507 E
APPLICATION NO. : 11/346577
DATED : August 17, 2010
INVENTOR(S) : Kenneth A. Meyers It is certified that error appears in the above-identified patent and that said Letters Patent is hereby corrected as shown below:

Column 8, line 64, cancel "through the air filter" and substitute therefore --through the filter--.

Signed and Sealed this

Twenty-third Day of November, 2010

David J. Kappos

David J. Kappos
*Director of the United States Patent and Trademark Office*